(12) United States Patent  (10) Patent No.: US 9,770,788 B2
Anderson et al.  (45) Date of Patent: *Sep. 26, 2017

(54) ALUMINUM ALLOY WELDING WIRE

(71) Applicant: ILLINOIS TOOL WORKS INC., Glenview, IL (US)

(72) Inventors: Bruce Edward Anderson, Traverse City, MI (US); Christopher Hsu, Appleton, WI (US)

(73) Assignee: HOBART BROTHERS COMPANY, Troy, OH (US)

( * ) Notice: Subject to any disclaimer, the term of this patent is extended or adjusted under 35 U.S.C. 154(b) by 662 days.

This patent is subject to a terminal disclaimer.

(21) Appl. No.: 14/161,432

(22) Filed: Jan. 22, 2014

(65) Prior Publication Data

US 2014/0190952 A1 Jul. 10, 2014

Related U.S. Application Data

(63) Continuation-in-part of application No. 13/023,158, filed on Feb. 8, 2011.

(Continued)

(51) Int. Cl.
B23K 31/02 (2006.01)
B23K 35/28 (2006.01)
B23K 35/40 (2006.01)
B23K 35/02 (2006.01)
C22C 21/02 (2006.01)
B23K 35/38 (2006.01)

(52) U.S. Cl.
CPC ........ *B23K 35/286* (2013.01); *B23K 35/0261* (2013.01); *B23K 35/28* (2013.01);
(Continued)

(58) Field of Classification Search
CPC .... B23K 35/286; B23K 35/383; B23K 35/28; B23K 35/288; B23K 35/40; B23K 35/0261; B23K 35/0227; C22C 21/02
(Continued)

(56) References Cited

U.S. PATENT DOCUMENTS 2,111,791 A 3/1938 Larson
2,508,008 A * 5/1950 Block .................. B23K 35/286
420/548

(Continued)

FOREIGN PATENT DOCUMENTS

CN 102139424 A * 8/2011 ......... B23K 35/3602
DE EP 0004096 A1 * 9/1979 ............. B23K 1/008
(Continued)

OTHER PUBLICATIONS

WordStdIndex SAE AMS 4245C-2003 (2003).*
(Continued)

*Primary Examiner* — Kiley Stoner
(74) *Attorney, Agent, or Firm* — Fletcher Yoder P.C.

(57) ABSTRACT

A composition for welding or brazing aluminum comprises silicon (Si) and magnesium (Mg) along with aluminum in an alloy suitable for use in welding and brazing. The Si content may vary between approximately 4.7 and 10.9 wt %, and the Mg content may vary between approximately 0.20 wt % and 0.50 wt %. The alloy is well suited for operations in which little or no dilution from the base metal affects the Si and/or Mg content of the filler metal. The Si content promotes fluidity and avoids stress concentrations and cracking The Mg content provides enhanced strength. Resulting joints may have a strength at least equal to that of the base metal with little or no dilution (e.g., draw of Mg). The joints may be both heat treated and artificially aged or naturally aged.

20 Claims, 1 Drawing Sheet

Related U.S. Application Data

Figure 1:
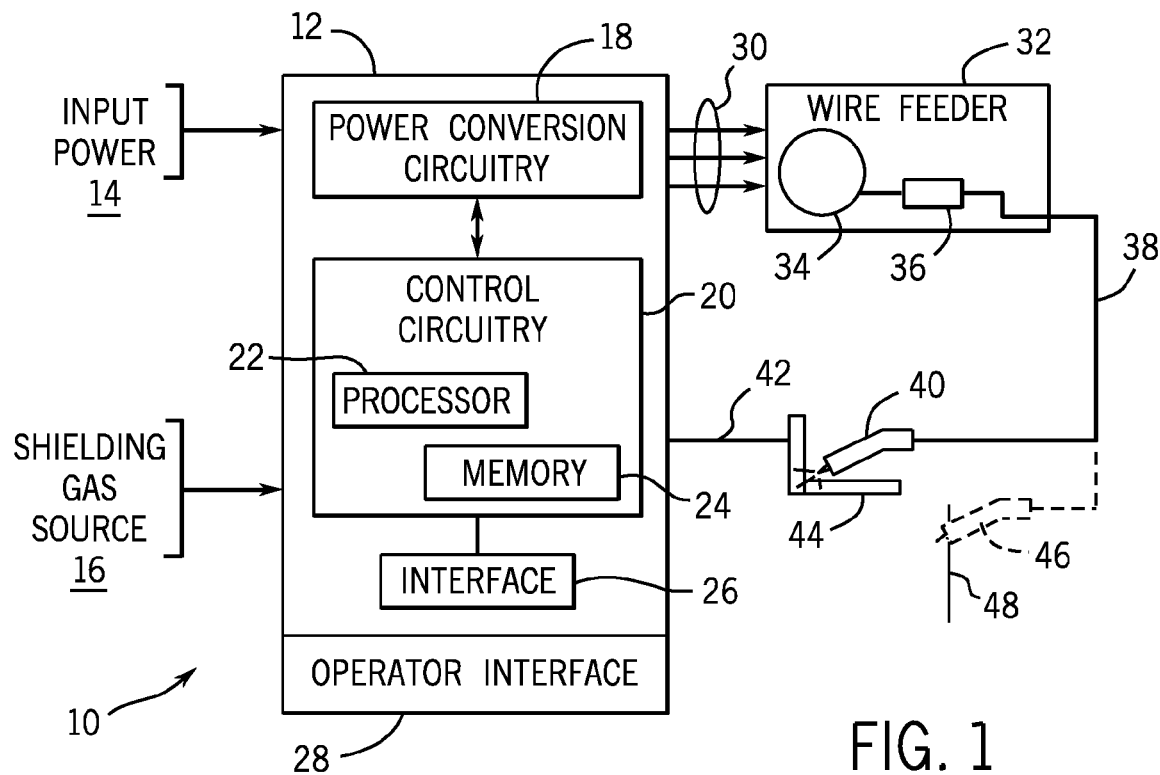

(60) Provisional application No. 61/303,149, filed on Feb. 10, 2010.

(52) U.S. Cl.
CPC .......... *B23K 35/288* (2013.01); *B23K 35/383* (2013.01); *B23K 35/40* (2013.01); *C22C 21/02* (2013.01)

(58) Field of Classification Search
USPC .................................................. 420/528–554
See application file for complete search history.

(56) References Cited

U.S. PATENT DOCUMENTS

| | | | | |
|---|---|---|---|---|
| 3,071,678 | A * | 1/1963 | Neely | B05B 7/226 118/302 |
| 3,271,554 | A * | 9/1966 | Johnson | B23K 9/04 219/73 |
| 3,322,517 | A * | 5/1967 | Miller | B23K 1/19 428/654 |
| 3,373,482 | A * | 3/1968 | Miller | B23K 1/19 228/199 |
| 3,373,483 | A * | 3/1968 | Miller | B23K 35/286 228/199 |
| 3,852,873 | A * | 12/1974 | Chartet | B23K 1/0012 228/183 |
| 3,891,400 | A * | 6/1975 | Robinson | B23K 35/002 428/654 |
| 4,098,957 | A * | 7/1978 | Vernam | B23K 35/286 428/654 |
| 4,146,163 | A * | 3/1979 | Anderson | B23K 20/04 228/158 |
| 4,229,643 | A * | 10/1980 | Caldwell | B23K 35/3073 219/146.1 |
| 4,326,662 | A | 4/1982 | Anderson | |
| 4,716,959 | A * | 1/1988 | Aoki | B23K 1/19 165/152 |
| 5,512,081 | A * | 4/1996 | DelGrosso | B23K 35/286 75/255 |
| 5,576,112 | A * | 11/1996 | Izuchi | C22C 21/02 428/654 |
| 5,728,479 | A * | 3/1998 | Childree | B23K 35/0238 228/262.51 |
| 5,971,258 | A * | 10/1999 | Eichhorn | B32B 15/016 148/528 |
| 5,994,664 | A * | 11/1999 | Anderton | B23P 15/00 219/121.64 |
| 6,261,706 | B1 * | 7/2001 | Fukuda | B32B 15/016 165/133 |
| 6,440,583 | B1 * | 8/2002 | Ueno | B23K 35/286 148/439 |
| 6,957,762 | B2 * | 10/2005 | Kroetsch | C22C 21/08 228/221 |
| 7,247,392 | B2 * | 7/2007 | Sugano | F28F 19/06 148/535 |
| 2001/0006607 | A1 * | 7/2001 | Bekki | B21C 23/002 420/532 |
| 2002/0012810 | A1 | 1/2002 | Osame | |
| 2002/0088717 | A1 * | 7/2002 | Wittebrood | B23K 1/18 205/259 |
| 2004/0155095 | A1 | 8/2004 | Kroetsch | |
| 2005/0023258 | A1 | 2/2005 | Tsushima | |
| 2005/0079376 | A1 * | 4/2005 | Benedictus | B23K 1/0012 428/654 |
| 2005/0271542 | A1 * | 12/2005 | Frankel | B23K 35/004 420/457 |
| 2006/0027625 | A1 * | 2/2006 | Dockus | B23K 35/282 228/56.3 |
| 2006/0035100 | A1 * | 2/2006 | Goodrich | B23K 1/0012 428/615 |
| 2006/0177688 | A1 * | 8/2006 | Meijers | B23K 35/0233 428/654 |
| 2006/0243719 | A1 * | 11/2006 | Inoue | B23K 35/26 219/146.41 |
| 2007/0045260 | A1 * | 3/2007 | Feng | B23K 9/025 219/137 WM |
| 2007/0187379 | A1 | 8/2007 | Osuki | |
| 2008/0193792 | A1 | 8/2008 | Cottignies | |
| 2011/0194973 | A1 * | 8/2011 | Anderson | B23K 35/0227 420/534 |
| 2011/0204124 | A1 * | 8/2011 | Wittebrood | B23K 1/0012 228/219 |
| 2012/0121896 | A1 * | 5/2012 | Ning | C04B 37/006 428/336 |
| 2013/0313240 | A1 * | 11/2013 | Amata | B23K 35/36 219/137.2 |
| 2014/0174606 | A1 * | 6/2014 | Nagae | B23K 35/286 148/26 |
| 2014/0190952 | A1 * | 7/2014 | Anderson | B23K 35/383 219/146.22 |
| 2014/0329109 | A1 * | 11/2014 | Takewaka | B23K 1/0012 428/654 |
| 2015/0037607 | A1 * | 2/2015 | Itoh | B23K 35/0238 428/654 |
| 2015/0053751 | A1 * | 2/2015 | Eckhard | C22C 19/056 228/117 |
| 2015/0118517 | A1 * | 4/2015 | Itoh | C22C 21/00 428/654 |
| 2015/0321294 | A1 * | 11/2015 | Anderson | C22C 21/00 420/531 |
| 2016/0325367 | A1 * | 11/2016 | Eckhard | B23K 35/286 |

FOREIGN PATENT DOCUMENTS

| | | | | |
|---|---|---|---|---|
| DE | WO 2010000666 A1 * | 1/2010 | .......... | B23K 35/002 |
| FR | WO 2009156607 A1 * | 12/2009 | ......... | B23K 35/0238 |
| GB | 1020628 A * | 2/1966 | .......... | B23K 35/286 |
| GB | EP 0039153 A1 * | 11/1981 | .......... | B23K 35/286 |
| GB | 8507165 | * 4/1985 | | |
| GB | 02159176 | 11/1985 | | |
| JP | 58031055 A * | 2/1983 | | |
| JP | 02034297 A * | 2/1990 | | |
| JP | H05208296 | 8/1993 | | |
| JP | 06000640 A * | 1/1994 | | |
| JP | 06000640 A * | 1/1994 | | |
| JP | 06000687 A * | 1/1994 | | |
| JP | 06182582 A * | 7/1994 | | |
| JP | WO 2012043030 A1 * | 4/2012 | ......... | B23K 35/0233 |
| WO | 9838347 | 9/1998 | | |
| WO | 02090031 | 11/2002 | | |

OTHER PUBLICATIONS

P.B. Dickerson, "Welding of Aluminum Alloys, Welding, Brazing, and Soldering," vol. 6, ASM Handbook, ASM Internationl, 1993, p. 722-739.

R.B.C. Cayless, "Alloy and Temper Designation Systems for Aluminum and Aluminum Alloys, Properties and Selection; Nonferrous Alloys and Special-Purpose Materials," vol. 2, ASM Handbook, ASM International, 1990, p. 15-28.

Alcotech Wire Corporation: "Alloy 4643 Weld Data Sheet," Jan. 1, 2013. http://www.alcotec.com/us/en/support/upload/a4643tds.pdf.

International Search Report from PCT application No. PCT/US2014/066282, dated Mar. 9, 2015, 11 pgs.

U.S. Welding Corporation: "World class welding wire for crotical applications; Technical Data Sheets & Material Data Sheets"; US, Jan. 1, 2010 (Jan. 1, 2010), XP002634245, Retrieved from Internet: URL:www.uswheldingcorp.com/aluminum-alloys.htm [retrieved on Apr. 18, 2011] the whole document.

International Search Report for application No. PCT/US2011/024064 mailed May 9, 2011.

Davis, J.R., "Aluminum and Aluminum Alloys," ASM Specialty Handbook, ASM International, 1993, p. 639.

Chu, Jijun; "Aluminium and Aluminium Alloy Wires and Rods," GB/T 10858-2008, Apr. 16, 2008.

"Aluminum and Aluminum Alloys," ASM Specialty Handbook, ASM International, 1993, p. 41.

(56) References Cited

OTHER PUBLICATIONS

"International Alloy Designations and Chemical Composition Limits for Wrought Aluminum and Wrought Aluminum Alloys," The Aluminum Association Teal Sheets, revised Jan. 2015, p. 1, 5, 6, 15.

Anderson, Tony, "Welding Aluminum—Questions and Answers: A Practical Guide for Troubleshooting Aluminum Welding-Related Problems," American Welding Society, 2008, p. 84, 85, 88.

Anderson, Tony, "Welding Aluminum—Questions and Answers: A Practical Guide for Troubleshooting Aluminum Welding-Related Problems," American Welding Society, 2nd ed., 2010, p. 26-29.

Davis, J.R., "Alloying: Understanding the Basics," Aluminum and Aluminum Alloys, ASM International, 2001, p. 351-416.

Hatch, John E. ed., "Aluminum: Properties and Physical Metallurgy," American Society for Metals, 1984, pp. 225 & 226.

Jacobson, David M., and Giles Humpston, "Principles of Brazing," ASM International, 2005, p. 48 & 78.

Moller, Craig, and Jim Grann, "Vaccum Aluminum Brazing—What Matters Most: Fundamentals and Case Studies," Ipsen Incorporated, accessed Jan. 16, 2017, p. 1-9, http://www.ipsenusa.com/Documents/Ipsen-USA/Technical-Papers/VABWhatMatters.pdf.

* cited by examiner

ALUMINUM ALLOY WELDING WIRE

CROSS REFERENCE TO RELATED APPLICATIONS

This application is a Continuation-in-Part application of U.S. patent application Ser. No. 13/023,158, entitled "Aluminum Alloy Welding Wire", filed Feb. 8, 2011, which is a Non-Provisional application of U.S. Provisional Patent Application No. 61/303,149, entitled "Aluminum Alloy Welding Wire", filed Feb. 10, 2010, both of which are herein incorporated by reference in their entireties for all purposes.

BACKGROUND

The invention relates generally to the field of welding filler metals, and more particularly to compositions suitable for welding aluminum alloys.

Many different processes are known and currently in use for joining metal articles, including brazing and welding. Both such operations may be used for joining of aluminum and aluminum alloy articles. Unlike steels and other metals, aluminum alloys present unique problems owing, for example, to their metallurgy, their melting points, the changes in strength as a function of particular alloying agents, and so forth. Moreover, increasing interest in both thinner aluminum alloy workpieces on one hand, and thicker workpieces on the other presents additional difficulties in the selection of brazing and welding materials that perform well and provide the desired physical and mechanical properties.

Brazing operations use a filler metal with a melting temperature that is lower than the base metal being joined. In brazing, the base metal is not melted and the alloying elements in the filler metal are selected for their ability to lower the melting temperature of the filler metal and to wet the aluminum oxide always present on the base metal so that a metallurgical bond can be achieved without melting the base metal. In some applications, brazing may be conducted in a furnace under vacuum or protective atmosphere where the temperature is raised until only the filler metal melts and fills the joint between the solid base metal members through fluid flow and capillary action. Brazed joints are commonly used for low strength aluminum alloys, and for very thin section structures, such as radiators for automobiles, and for heat exchangers such as those used in heating, ventilation and air conditioning systems. The temperatures used in brazing may anneal both non-heat treatable and heat treatable aluminum alloys, which may alter the mechanical properties achieved either by cold working or heat treatment and aging operations. Therefore, brazing, while quite useful in many applications, may not be suitable to join high strength structural alloys.

Welding operations join metal parts by melting a portion of the base metal of each work piece to be joined, as well as by melting of the filler metal to create a molten weld pool at the joint. Welding requires concentrated heat at the joint to create the molten weld pool which upon solidification has a resultant chemical composition that is a combination of the chemistries of the filler metal and the base metal. Welding temperatures may often be controlled to be sufficiently high to melt both the filler metal and the base metal, but also to keep the heat affected zone of the base metal to a minimum in order to retain its mechanical properties.

The adder materials, both for brazing and welding, are typically delivered in the form of wire, which, depending upon the application, may be in the form of continuous lengths that are fed though a welding torch, or in shorter lengths that may be hand-fed, or even as rods, such as flux-coated rods for stick welding. Currently available aluminum alloy brazing and welding wires do not, however, satisfy the needs of many modern applications. For example, current products do not offer the desired fluidity during the joining operation, or the desired strength when combined with base material in welding applications, particularly when used with a range of modern welding processes. Moreover, where welding arcs vary in penetration, heat, weld pool formation, and so forth, current aluminum alloy wires and compositions do not provide a desired degree of consistency in terms of the composition and strength of the ultimate joint.

There is currently a need for improved aluminum alloy compositions that are suitable for welding (and brazing) applications that successfully address such needs.

BRIEF DESCRIPTION

In accordance with one aspect, the invention provides a composition for forming weld or braze joints, comprising silicon in a weight percent of between approximately 4.7% inclusive and 10.9% inclusive, magnesium in a weight percent of between approximately 0.15% inclusive and 0.50% inclusive and a remainder of aluminum and trace components. Particular subranges of these are particularly attractive for their enhanced performance and superior strength. Moreover, the invention provides a filler metal product (e.g., welding consumable) for welding or brazing that comprises a spooled or linear wire or rod (or brazing component, such as brazing rings or paste) comprising an alloy of silicon in a weight percent of between approximately 4.7% inclusive and 10.9% inclusive, magnesium in a weight percent of between approximately 0.15% inclusive and 0.50% inclusive, and a remainder of aluminum and trace components.

In accordance with another aspect, the invention offers a method for forming a weld or braze joint, comprising melting at least a portion of a work piece base metal, adding to the melted base metal a filler metal comprising an alloy of silicon in a weight percent of between approximately 4.7% inclusive and 10.9% inclusive, magnesium in a weight percent of between approximately 0.15% inclusive and 0.50% inclusive, and a remainder of aluminum and trace components, and allowing the resulting weld or braze joint to solidify. Here again, certain processes and subranges are particularly attractive for their performance and strength properties. This invention is also intended to cover joints and structures made by the new methods and materials provided.

DRAWINGS

Figure 2:
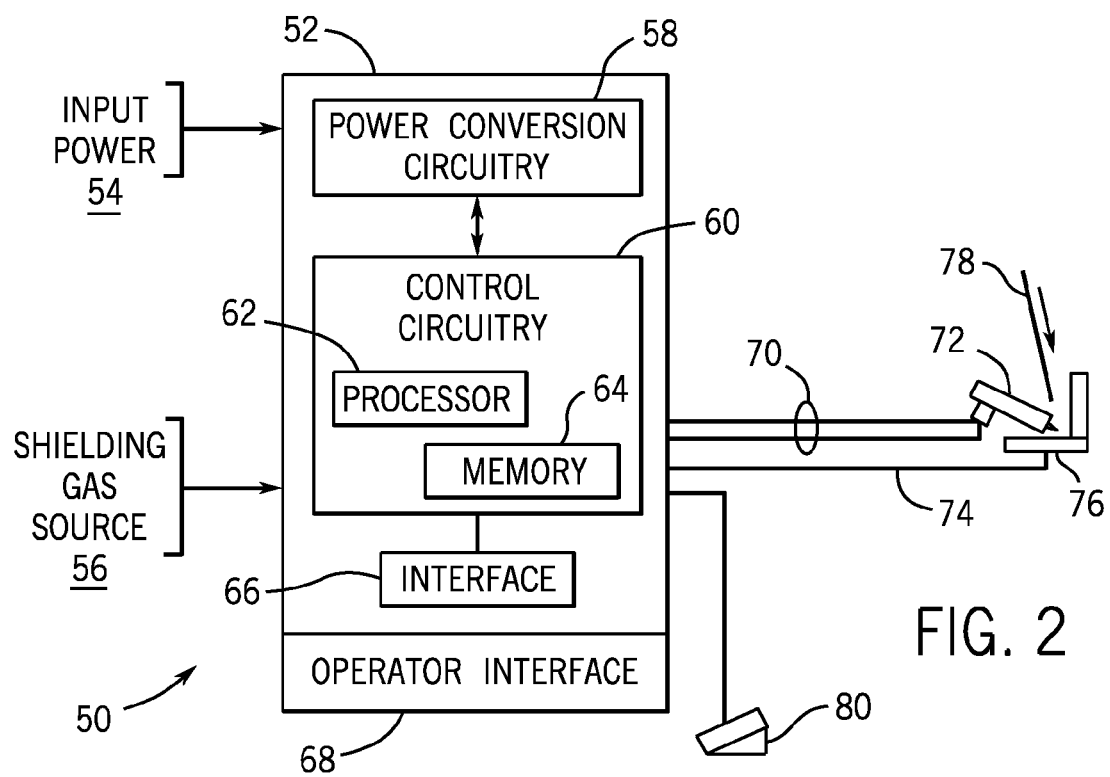

These and other features, aspects, and advantages of the present invention will become better understood when the following detailed description is read with reference to the accompanying drawings in which like characters represent like parts throughout the drawings, wherein:

FIG. 1 is a diagrammatical view of one exemplary welding system suitable for use of the new compositions disclosed herein; and FIG. 2 is a diagrammatical view of another exemplary welding system suitable for use of the new compositions.

DETAILED DESCRIPTION

The present disclosure provides first a description of the new compositions offered by the present invention, followed by a discussion of typical welding operations that may be used advantageously with the new compositions, and then a discussion of certain exemplary applications that may benefit from the use of the compositions. Throughout the discussions, it should be borne in mind that the new compositions are not necessarily limited to use in welding, or even as filler metals, but may be useful in other applications and operations, such as brazing. Similarly, while references are made to "welding wire", this term should be understood, when used, as referring to any suitable form of adder metal, including without limitation, continuous wire intended for wire feeder applications (e.g., for metal inert gas (MIG) welding), rod and sticks (e.g., for tungsten inert gas (TIG) and stick welding), as well as other forms for welding, fusing, brazing, braze cladding of sheet and similar operations.

In a first aspect, new compositions are provided for welding work pieces made from aluminum (Al) and aluminum alloys. In a broad sense, the compositions comprise 4.7 to 10.9 wt % silicon (Si), 0.15 to 0.50 wt % magnesium (Mg), and the remainder Al with trace elements ordinarily found in aluminum filler metals. Presently contemplated embodiments include Si in a range of 4.7 to 8.0 wt %, and in one embodiment, from 5.0 to 6.0 wt %. Moreover, certain embodiments comprise Mg in a range of from 0.31 to 0.50 wt % for enhanced strength in many welds.

Aluminum, as it is available from the major aluminum producers of the world, may contain trace element impurities including but not limited to iron (Fe), copper (Cu), manganese (Mn), zinc (Zn), titanium (Ti), and beryllium (Be). In one embodiment, the aluminum alloy welding wire may further comprise any or all of the following elements in an amount up to and including: 0.80 wt % Fe, 0.30 wt % Cu, 0.15 wt %, Mn, 0.20 wt % Zn, 0.20 wt % Ti, and 0.0003 wt % Be (with all other trace elements limited to each 0.05 wt % and a total 0.15 wt %). Such additional trace elements may comprise zirconium, scandium, and/or chromium, in certain embodiments. For example, in certain embodiments, the aluminum alloy welding wire may comprise up to and including 0.90 wt % Fe, up to and including 0.80 wt % Fe, up to and including 0.70 wt % Fe, up to and including 0.45 wt % Fe, up to and including 0.40 wt % Fe, and so forth. In addition, in certain embodiments, the aluminum alloy welding wire may comprise up to and including 0.35 wt % Cu, up to and including 0.30 wt % Cu, up to and including 0.25 wt % Cu, up to and including 0.20 wt % Cu, up to and including 0.15 wt % Cu, up to and including 0.10 wt % Cu, and so forth. In addition, in certain embodiments, the aluminum alloy welding wire may comprise up to and including 0.20 wt % Mn, up to and including 0.15 wt % Mn, up to and including 0.10 wt % Mn, up to and including 0.05 wt % Mn, and so forth. In addition, in certain embodiments, the aluminum alloy welding wire may comprise up to and including 0.25 wt % Zn, up to and including 0.20 wt % Zn, up to and including 0.15 wt % Zn, up to and including 0.10 wt % Zn, and so forth. In addition, in certain embodiments, the aluminum alloy welding wire may comprise up to and including 0.25 wt % Ti, up to and including 0.20 wt % Ti, up to and including 0.15 wt % Ti, and so forth. In addition, in certain embodiments, the aluminum alloy welding wire may comprise up to and including 0.001 wt % Be, up to and including 0.0005 wt % Be, up to and including 0.0003 wt % Be, and so forth. As such, in certain embodiments, all trace elements (i.e., elements other than silicon, magnesium, and aluminum) may comprise up to and including 1.8 wt % of the aluminum alloy welding wire, up to and including 1.5 wt % of the aluminum alloy welding wire, up to and including 1.0 wt % of the aluminum alloy welding wire, up to and including 0.95 wt % of the aluminum alloy welding wire, up to and including 0.90 wt % of the aluminum alloy welding wire, up to and including 0.85 wt % of the aluminum alloy welding wire, up to and including 0.80 wt % of the aluminum alloy welding wire, up to and including 0.75 wt % of the aluminum alloy welding wire, and so forth.

In embodiments where the compositions are formed into welding wire, such wire (e.g. filler metal) may be provided for use in welding applications in a linear form. The linear wire, continuous or cut to length, typically has a diameter of at least 0.010 inches and typically less than 0.30 inches. In preferred embodiments the linear wire has one or more diameters, such as 0.023 inches, 0.030 inches, 0.035 inches (or 0.9 mm), 0.040 inches, 0.047 inches (or 3/64" or 1.2 mm), 0.062 inches (or 1/16" or 1.6 mm), 0.094 inches (or 3/32" or 2.4 mm), 0.125 inches (or 1/8" or 3.2 mm), 0.156 inches, 0.187 inches, and 0.250 inches.

The amounts of the individual components (e.g. Si and Mg) of the filler material with the remainder of Al with trace impurities can be selected to produce a specific filler alloy for a desired purpose. For example, as noted above the alloy composition comprises: approximately 4.7 to approximately 10.9 wt % Si, and more particularly, amounts towards the middle of this range, such as below approximately 8.0 wt %. In particular embodiments, the Si content may be, for example, approximately 5.0 to approximately 6.0 wt % (e.g. approximately 5.2 to approximately 5.8 wt % Si), or between approximately 5.4 to approximately 6.0 wt % (e.g., approximately 5.5 to approximately 5.8 wt %). In certain embodiments, the silicon content may be, for example, between approximately 4.6 wt % and approximately 6.0 wt %, between approximately 4.7 wt % and approximately 6.0 wt %, between approximately 4.6 wt % and approximately 5.9 wt %, between approximately 4.7 wt % and approximately 5.9 wt %, between approximately 4.8 wt % and approximately 5.8 wt %, and so forth.

Within any of these Si ranges the amount of Mg may be varied between approximately 0.15 wt % and approximately 0.50 wt %, inclusive. In other words, within any of the above Si ranges, the Mg level may be selected to be approximately 0.17 to approximately 0.40 wt %, approximately 0.20 to approximately 0.30 wt %, approximately 0.22 to approximately 0.30 wt %, approximately 0.25 to approximately 0.30 wt %, approximately 0.15 to approximately 0.25 wt %, approximately 0.15 to approximately 0.23 wt %, approximately 0.15 to approximately 0.20 wt %, approximately 0.18 to approximately 0.28 wt %, and/or approximately 0.20 to approximately 0.25 wt %. In certain embodiments, the magnesium content may be, for example, between approximately 0.20 wt % and approximately 0.50 wt %, between approximately 0.21 wt % and approximately 0.50 wt %, between approximately 0.20 wt % and approximately 0.49 wt %, between approximately 0.21 wt % and approximately 0.49 wt %, between approximately 0.25 wt % and approximately 0.45 wt %, and so forth. In a presently contemplated embodiment, the amount of Mg is towards a higher end of the range, from approximately 0.31 wt % to approximately 0.50 wt % to allow for enhanced weld strength independent of dilution of the base metal, as discussed below. One presently contemplated embodiment intended to be registered with the Aluminum Association and submitted to the American Welding Society for certification as an approved aluminum welding alloy is X4043P which has a Si content of approximately 5.0 to approximately 6.0 wt % and a Mg content of approximately 0.31 to approximately 5.0 wt %.

It will be appreciated that, with the silicon, magnesium, and trace element compositional ranges of the aluminum alloy welding wire described herein, the remainder of aluminum may include between approximately 88.0 wt % and approximately 95.0 wt %, approximately 90.0 wt % and approximately 95.0 wt %, approximately 92.5 wt % and approximately 95.0 wt %, or approximately 92.5 wt % and approximately 94.0 wt % of the aluminum alloy welding wire. In other words, with respect an elemental analysis, in certain embodiments, the aluminum alloy welding wire described herein consists essentially of silicon, magnesium, aluminum, and the trace elements described above. It will also be appreciated that any of the values or ranges of silicon, magnesium, aluminum, and the trace elements may be combined with the others in certain embodiments. Indeed, certain overlapping ranges described above for silicon, magnesium, aluminum, and the trace elements may be combined to form smaller or larger ranges.

The compositions of the invention are particularly well suited to welding applications, although they may also be used for brazing and other operations (e.g., plating). FIGS. 1 and 2 illustrate exemplary welding systems that may advantageously be used to produce joints in aluminum and aluminum alloy workpieces using the compositions disclosed herein. As mentioned above, a range of welding systems and processes may be employed, including MIG processes, TIG processes, stick welding processes and so forth (as well as brazing processes). FIG. 1 illustrates an exemplary MIG system 10 that includes a power supply 12 designed to receive power from a source 14, and shielding gas from a gas source 16. In many implementations, the power source will include the power grid, although other sources will also be common, such as engine-generator sets, batteries, and other power generation and storage devices. The shielding gas will typically be provided by pressurized bottles.

The power supply 12 includes power conversion circuitry 18 that converts incoming or stored power to a form suitable for welding. As will be appreciated by those skilled in the art, such circuitry may include rectifying circuits, converters, inverters, choppers, boost circuits and so forth. Moreover, the circuitry may produce alternating current or direct current output, depending upon the welding process selected. The power conversion circuitry is coupled to control circuitry 20 for controlling the operation of the conversion circuitry. In general, the control circuitry will include one or more processors 22 and memory 24 that stores welding parameters, setpoints, welding process routines and so forth executed by the processor for regulating operation of the conversion circuitry. By way of example, the processor may cause the conversion circuitry to implement constant current processes, constant voltage processes, pulse welding processes, short circuit transfer processes, or any other suitable process adapted for welding aluminum parts with the compositions disclosed. An operator interface 28 allows a welding operator to select the welding process as well as to set welding parameters, such as currents, voltages, wire feed speeds, and so forth.

The power supply 12 is coupled via cabling 30 to a wire feeder 32. The cabling may include power cabling for transmitting weld power, data cabling for transmitting control and feedback signals, and gas hose or cabling for providing shielding gas. The wire feeder 32 includes a spool 34 of welding wire according to the compositions disclosed. A wire drive 36 draws wire from the spool and advances the wire to a welding cable 38 coupled to a welding torch 40. The wire drive will typically operate based upon settings made on the power supply, although the wire feeder may include its own processor and memory (not shown) that control or coordinate for control of the wire feed speed, application of power from the power supply to the advancing wire, and so forth. It should also be noted that the wire feeder may include its own interface (not represented) allowing the welding operator to make changes to the welding process, the weld settings, the wire feed speed, and so forth.

The welding cable 38 conveys power and gas to the welding torch 40, and may convey data signals (e.g., senses current and/or voltage) to the wire feeder (and therefrom to the power supply). In aluminum welding applications, the torch 40 may be adapted with an internal motor to pull welding wire while the wire feeder 32 pushes the wire in coordination. A workpiece cable 42 is coupled to the workpiece 44 to be welded, and allows for a completed circuit to be established through the torch, welding wire and workpiece to create a welding arc between the wire and workpiece. This arc is sustained during welding (under the particular welding process and control regime selected) and melts the welding wire and, typically, at least partially melts the workpiece or workpieces to be joined.

As illustrated by reference number 46 in FIG. 1, the welding system may be adapted to accept a stick welding torch. Such torches do not use a continuously spooled and fed welding wire, but stick electrodes 48, which may be made in accordance with the compositions disclosed. As will be appreciated by those skilled in the art, the stick welding torch may be coupled directly to a welding power supply 12 that performs other welding processes (e.g., MIG and TIG processes), or for this applications, the power supply may have more limited capabilities in terms of the available processes.

FIG. 2 illustrates an exemplary TIG system that may be used with the new compositions disclosed. The TIG system 50 also includes a power supply 52 that, similarly to the system described above, receives power from a source 54, and shielding gas from a source 56. As will be appreciated by those skilled in the art, the shielding gases used will typically be different depending upon the process selected. The power supply 52 again comprises power conversion circuitry 58 and associated control circuitry 60. The control circuitry 60 includes one or more processors 62 and memory 64 for storing weld settings, welding processes, and so forth. Here again, an operator interface 68 allows the welding operator to set such welding parameters for the TIG welding process.

In the TIG welding process, however, wire is not fed to the workpiece, but only power and gas are conveyed via appropriate cabling 70. The welding torch 72 receives the power and gas, and allows for initiation of a welding arc via an internal tungsten electrode. A workpiece cable 74 is coupled to the workpiece 76 to allow for completion of the electrical circuit. After an arc is initiated with the workpiece, welding wire 78 is fed to the weld location, and is melted, typically with at least some melting of the workpiece base metal. A foot pedal 78 (or another operator input device) allows for fine control of the process by the operator during the time the arc is ongoing and welding is proceeding.

It should also be noted that the processes used with the present compositions may be partially or fully automated. That is, in some settings, the joints may be programmed for execution by automated welding systems, robots, and the like. In most such settings, the welding wire will be fed continuously from a spool, as discussed above. Moreover, the compositions may be used with a number of other processes and applications, such as laser welding, spot welding, laser brazing, and so forth. While the processes may be designed for joining aluminum and aluminum alloys, the compositions are in no way limited to such applications, and may be used for joining non-aluminum base metals, such as steels.

The methods described above allow for the creation of a weld pool that contains the melted aluminum filler metal alloy and a portion of the melted workpiece(s). In certain embodiments the weld pool will contain more than 20 wt %, more than 30 wt %, more than 40 wt %, more than 50 wt %, more than 60 wt %, more than 70 wt %, more than 80 wt %, more than 90 wt %, more than 92 wt %, more than 94 wt %, more than 96 wt %, more than 98 wt %, or more than 99 wt % of the aluminum filler metal alloy with the remaining portion being made up of molten base workpiece(s).

Specifications for use of the present compositions may also advantageously call for heat treating and aging the resulting aluminum structure. Certain of these operations may be performed at a temperature greater than room temperature and below the melting points of the base metal workpiece(s), aluminum filler metal alloy, and the weld pool. For example, in certain embodiments, the temperature may be in a range of approximately 1050° F. and approximately 1185° F., in a range of approximately 1065° F. and approximately 1170° F., in a range of approximately 1080° F. and approximately 1155° F., in a range of approximately 1095° F. and approximately 1140° F., and so forth. The heat treating step may advantageously occur for a period of time between 30 minutes and 30 hours (e.g., between 1 hour and 10 hours, for example between 2 hours and 8 hours). Moreover, processing may include allowing the welded aluminum structure to age at temperatures above ambient temperatures for a period of time between 30 minutes and 30 days (e.g. between 1 hour and 1 week, for example between 2 hours and 12 hours). Still further, the compositions may benefit from aging at ambient temperature for periods on the order of from 1 week to 2 years (e.g., 2 weeks to 1 year, for example 1 month to 6 months).

It is believed that through the use of the present compositions and wires, superior welded aluminum structures can be produced that exhibit superior weld properties, including high shear and tensile strength compared to aluminum structures welded with other aluminum filler materials. For example, it is believed that the compositions offer stronger welds through solid solution strengthening in the as-welded condition and through the formation and precipitation of intermetallic compounds of Mg and Si when the weld itself together with the welded structure is post-weld heat treated and/or aged. It is also believed that the present compositions allow smaller fillet welds with equivalent shear strength of larger welds to be made with less heat input, thus reducing the HAZ of the welded structure in as-welded condition.

A variety of workpieces and workpiece configurations may benefit from the present compositions, such as single alloy sheets, braze clad sheets, plates, tubes, rods, bars, extrusions, castings, forgings, powdered metal parts, and cermets in all configurations (e.g. circular, square, triangular), or some combination thereof. The thicknesses can be any size required to create the desired welded structure. These compositions work equally well with all thicknesses of base metal work pieces and with all amounts of dilution of the weld puddle with melted base material.

Particularly enhanced properties are provided when used with aluminum alloy base materials in the 1xxx, 2xxx, 3xxx, 5xxx up thru 3% Mg, 6xxx, and 7xxx series aluminum alloys. More particularly, base metal workpieces from 6xxx series aluminum alloys may benefit from the present compositions. Such 6xxx series alloys are particularly popular for many aluminum structures insomuch as they are heat treatable. Such structures include, for example, extrusions, sheets, and plates, and are used to fabricate automobiles, truck trailers, boats, military vehicles, and countless other structures.

For many years the 6xxx series alloys have been welded with the aluminum-silicon binary alloy 4043. Alloy 4043 is non-heat treatable. Its as-welded strength is as low as 50% of the strength of the most widely used 6xxx series alloys joined by this alloy. If Mg is added to 4043, it becomes a heat treatable ternary alloy similar to the 6xxx series alloys and if enough Mg is added, will achieve significantly higher as-welded strength and similar mechanical properties as the 6xxx base metals when post-weld heat treated and aged. During the welding operation, the weld puddle is diluted by some amount of melted base metal, which is simply referred to as dilution. When welding 6xxx series base metals with 4043 for example, and dilution occurs, the filler metal is alloyed with base metal and the puddle acquires some Mg. The amount of strength increase in the weld depends on the amount of dilution. Welding codes such as AWS D1.2 have been established for base metals such as 6061. The code assumes a minimum dilution of 20% base metal and specifies the resultant shear and tensile strengths that must be met in the final welded assembly. These codes are used for design purposes and welding procedures are established to meet them in production.

However, prior to the present invention, the industry has not been able to consistently meet these codes for the 6xxx series alloys. When the chemistry ranges of the base metals and the filler metals are combined with all of the variables present in the welding process, the resultant Mg content of the weld puddle after welding is not consistent and cannot be controlled to the level required to meet code consistently. Of two common weldment designs commonly used, the fillet joint and the butt joint, 80% of commonly employed welds are fillet joints. By virtue of its physical shape, there is very little dilution when welding a fillet joint. Likewise when welding butt joints in structures with section thicknesses over ⅜ inch or thinner than 3/32 inch, there is little or no dilution. Consequently these weld joints do not draw sufficient Mg from the base metal to reach the desired strength either as-welded or post-weld heat treated and aged. This has created a very serious problem in industry. Aluminum is the metal of choice to reduce weight and energy consumption, but its use has been hampered by the filler metals available.

The present invention solves this problem. It provides an Al—Si—Mg ternary alloy with a chemistry range that yields the shear and tensile strengths required by AWS D1.2 for the 6xxx series alloys with little or no dilution (e.g., less than approximately 20% base metal dilution, less than approximately 10% base metal dilution, less than approximately 5% base metal dilution, approximately 0% base metal dilution, and so forth). The base metal dilution may be defined as the weight of the base metal melted divided by the total weight of the weld metal (i.e., all of the metal of the weld). For example, for a base metal dilution of approximately 20%, the fraction of the weld metal that came from the consumable electrode is approximately 80%. This filler metal composition is designed to take into account the chemical range of Si and Mg that can be experienced in the 6xxx series base alloys and the variables that can be encountered in the welding manufacturing process and assure that adequate levels of Si and Mg are present in the final weld to meet desired strength requirements. As discussed above, the new metal compositions may comprise varying amounts of Si and Mg, such as between 4.7 wt % and 10.9 wt % Si, and more particularly between 4.7 wt % and 8.0 wt %, and still more particularly, between 5.0 wt % and 6.0 wt %. The Mg component may vary between 0.15 wt % and 0.50 wt %, and between 0.15 wt % and 0.30 wt %, but for enhanced strength, may be between 0.31 wt % and 0.50 wt %.

Welded joints made via these compositions benefit both from the performance of the compositions during the joining operation, and from enhanced properties of the as-welded (or more generally, the as-joined) structures. For example, the Si component reduces the melting point and surface tension, providing improved fluidity. The relatively high Mg content reduces the need to draw Mg from the base metal for higher strength (e.g., matching or exceeding the strength of the base metal). This is particularly useful when joining thinner sections (from which little melting of the base metal occurs, or in which little material is available for contribution to the as-welded joint) as well as thicker sections (which may require multiple passes with subsequent passes increasingly unable to draw any Mg from the base metal or from earlier passes). In successive passes, substantially all (e.g., 99% or even more) of the magnesium in the respective pass is provided by the filler metal.

For example, 6061 base metal alloy is commonly used in sheet and plate forms, and is welded with 4043 filler metal. Alloy 6061 is a magnesium-silicon based alloy containing 1 percent magnesium and 0.6 percent silicon along with a small amount of copper and chromium. Alloy 6061 achieves its maximum mechanical properties through heat treatment where the aluminum metal matrix is strengthened by the precipitation of alloying elements as intermetallic compounds, in this case magnesium-silicide, the size and distribution of which throughout the matrix is controlled through carefully controlled thermal operations. This heat treated microstructure is quickly destroyed by welding with a typical loss of mechanical properties in the heat affected zone of the weld, between 30 and 50 percent. The un-welded tensile strength of 6061 in the -T6 heat treated condition is typically 45 KSI while the minimum specification as-welded tensile strength is 24 KSI. The fully annealed tensile strength of 6061 is typically 19 KSI. Depending on the welding conditions used, there can be portions of the 6061 base material in the heat affected zone that are fully annealed. The fully annealed tensile strength of 4043 is also typically 19 KSI and can be as low as 15 KSI. Moreover, 4043 is a non-heat treatable alloy.

Published data used for design purposes indicates mechanical properties for 6061 welded with 4043 in the as-welded and post-weld heat treated and aged conditions. This data was developed from actual welds made in various configurations. The data presumes that a certain percentage of base metal is melted during the welding process and is alloyed into the weld puddle resulting in a new chemistry that is a blend of 4043 and 6061. When this happens, some magnesium is introduced into the 4043 chemistry and if the base metal melting is sufficient, the weld puddle becomes an alloy that is solid-solution strengthened by the magnesium in the as-welded condition and will respond to heat treatment operations conducted after welding.

Table 1 below provides examples of data for 6061 base metal welded with 4043 both in the as-welded and post-heat treated and aged conditions:

TABLE 1

| Base Alloy | Filler alloy | Temper | Spec. condition | Tensile Strength (KSI) Minimum | Typical |
|---|---|---|---|---|---|
| 6061-T6 | 4043 | AW | AWS D1.2 | 24.0 | 27.0 |
| 6061-T6 | 4043 | AW | No dilution | 15.0 | 19.0 |
| 6061-T6 | 4043 | PWHT | Min 20% dil. 6061 | 42.0 | 45.0 |
| 6061-T6 | 4043 | PWHT | No dilution | 15.0 | 19.0 |
| 6061-T6 | 4643 | AW | Indep. of dilution | 24.0 | 27.0 |
| 6061-T6 | X4043P | AW | Indep. of dilution | >24.0 | >27.0 |
| 6061-T6 | 4643 | PWHT | Indep. of dilution | 42.0 | 45.0 |
| 6061-T6 | X4043P | PWHT | Indep. of dilution | >42.0 | >45.0 |

Note 1:
The as-welded and post-heat treated tensile strength of the alloy combinations without any dilution of the melted base metal in the weld puddle fail the AWS D1.2 design requirements.
Note 2:
The tensile strength requirements of AWS D1.2 are met without any dilution of melted base metal in the weld puddle for 4643, and X4043P.

As noted above, two common weld joint types, fillet joints and butt joints, make up a majority of all welds. The fillet joint most generally has a weld-joint angle of 90 degrees that must be filled with filler metal. For very thin base metal sections the welding operation necessitates that the amount of base metal melting be held to an absolute minimum and therefore the amount of weld puddle dilution by melted base metal is very small. For the example being used here, using 4043 filler metal, the resulting weld does not have sufficient magnesium to reach adequate strength in the as-welded condition and it will not respond to post-weld heat treatment and aging. This same condition occurs when the fillet weld is used with thick section sizes being joined. It this case the bottom of the weld joint may see adequate weld puddle dilution by melted base metal but as the weld joint is filled with multiple passes, the filler metal in the later passes is no longer next to the base material and will have no base metal dilution. Therefore, once again the weld will not have sufficient magnesium content to reach acceptable strength in the as-welded condition and it will not respond to post-weld heat treatment and aging. The published data and the AWS D1.2 welding code for fillet welds welded with 4043 recognizes this situation and the mechanical strength data correctly shows the strength of the weld to be that of 4043 without dilution. Butt joints on the other hand yield much higher percentages of base metal melting. For butt welds in 6061 welded with 4043, the published data and AWS D1.2 do assume adequate weld puddle dilution to achieve the specified strengths in the as-welded and post-weld heat treated and aged conditions. However, the amount of weld puddle dilution in butt welds is difficult to control and reproduce reliably in production welding operations.

Table 2 below provides typical maximum design strengths of fillet welds containing 100% filler metal only for certain currently available alloy welding wires:

TABLE 2

| Filler Alloy | Longitudinal Shear Strength (KSI) | Transverse Shear Strength (KSI) |
|---|---|---|
| 1100 | 7.5 | 7.5 |
| 4043 | 11.5 | 15.0 |
| 4643 | 13.5 | 20.0 |
| X4043P | >13.5 | >20.0 |
| 5654 | 12.0 | 18.0 |
| 5554 | 17.0 | 23.0 |
| 5356 | 17.0 | 26.0 |

Butt welds in section sizes greater than 3/8 inches do not produce enough base-metal melting in the center of the weld to reach the minimum desired amount of base metal dilution into the weld puddle. Therefore, because 4043 must obtain magnesium from dilution by melted base metal into the weld puddle, the control of resultant mechanical properties in both the as-welded and post-weld heat treated and aged condition is difficult if not impossible to obtain reliably on a production basis.

As noted above, the present compositions may be used with a variety of welding processes. The development of certain of these welding processes has complemented the move to produce structures with thinner section sizes. Processes such as pulsed welding allow the welding of increasingly thin section sizes due to its prevention of significant base metal melting. In thin section structures in particular, the currently available silicon based welding alloys make it impossible to achieve desired design strengths and this has limited design options for parts that could otherwise reduce weight and maintain strength. Developments to address such problems have included, for example, an alloy registered as 4643, which was thought to offer a solution for butt welding thick section 6061 base metals. It can of course be used to weld thin sections as well where the same problems of lack of puddle dilution are present. Alloy 4643 is a replication of the alloy that is obtained from the blending of 20% 6061 and 80% 4043 which results from weld puddle dilution during welding operations. The lower silicon content of 4643 decreases its fluidity, increases its melting temperature, and increases its solidification and solid state shrinkage as compared to 4043. Moreover, 4643 is again subjected to dilution by the low silicon containing 6xxx series alloys during welding. The resulting alloys exhibit less than optimum welding characteristics and increased crack sensitivity problems when the weld puddle silicon levels fall to 2 percent or lower during welding. As a result, 4643 has not been adopted as a viable alternative to 4043 and has been used only in a few instances to solve very specific problems. The alloy has only been produced in very small quantities and costs as much as seven times the cost of 4043, making it economically unviable.

The present compositions address such shortcomings of the 6061/4043 alloy combination. The compositions contain the required level of magnesium without relying on weld puddle dilution to reach desired as-welded and post-weld heat treated mechanical properties. Moreover, the compositions experience sufficient solution and quench rates during welding such that they will naturally age over time and increase in strength over the first year at room temperature. They also provide the fabricator the option to purchase 6xxx series base alloys in the -T4 temper which is solution heat treated and quenched but not aged. Then, after welding with the present compositions, the finished weldment can simply be aged to achieve strength levels close to that of the -T6 temper.

Moreover, the present compositions will provide every weld, regardless of the type or dilution factors, with an automatic as-welded increase in longitudinal shear strength on the order of at least 17%, transverse shear strength on the order of at least 33%, and tensile strength on the order of at least 42% when compared with 4043, and an increase in post-weld heat treated shear strength on the order of at least 130%. For example, in certain embodiments, the as-welded longitudinal shear strength of the weld may be within a range of 16-20 KSI, within a range of 17-19 KSI, or approximately 18 KSI; the as-welded tensile strength of the weld may be within a range of 30-40 KSI, within a range of 32-38 KSI, or approximately 35 KSI; the post-weld transverse shear strength of the weld may be within a range of 25-35 KSI, within a range of 28-33 KSI, or approximately 31 KSI; and the post-weld tensile strength of the weld may be within a range of 35-50 KSI, within a range of 40-45 KSI, or approximately 42 KSI. Heat treating the weld may increase one or more of these strengths by 15-30% compared to the post-weld strengths (e.g., a heat treated shear strength within a range of 32-43 KSI, within a range of 34-41 KSI, and so forth, and a heat treated tensile strength within a range of 46-58 KSI, within a range of 49-55 KSI, and so forth). It should be noted that the certain strengths are characterized as "post-weld" strengths, however, in the case where a filler metal (e.g., having properties as described herein) is bonded to a work piece using a brazing process, these strengths could be characterized as "post-brazing" or, more generally, "post-bonding" strengths.

Another important consideration is the amount of filler metal required to produce an adequate weld. Fillet weld shear strengths are calculated using the fillet's cross sectional throat dimension along with the published shear strength of the relevant filler alloy. See Table 1 above for some typical shear strengths of various pure filler metal alloys. As the fillet size grows as a result of the welding procedure or the number of passes made, the increase in throat dimension is not linear with the volume of the fillet metal used. If the throat dimension is doubled, the volume required to fill the fillet increases by a factor 4. But the volume of filler metal required may be even more than this since the number of weld passes required to fill the fillet rises quickly as the throat dimension is increased, and welders have to deal with full weld passes when covering underlying passes. In situations where there is no penetration of the base metal and the required weld puddle dilution by melted base metal is not present, designers are forced to increase the fillet weld throat dimensions in order to obtain adequate weld strengths. This results in the consumption of significantly larger quantities of expensive filler metals raising the cost of the welded structure. The increased strength obtained by using the present compositions will significantly reduce cost by reducing the required size of the fillet weld, as significant weld penetration is not required in order to draw sufficient Mg into the weld puddle to achieve the desired strength. Moreover, using the present compositions, welds will naturally age in the as-welded condition and will age more rapidly as service temperatures rise. Their mechanical properties will continually increase over time for at least the first year after welding.

Regarding the absolute and relative quantities of Si and Mg in the present compositions, the inventor has recognized that Si based aluminum welding filler metal alloys fabricated as wire may be from a hypoeutectic composition. As the Si content increases, the freezing range decreases and both the liquidus and solidus decrease. This decrease results in reduced crack sensitivity of the alloy. The Al—Si alloys are sensitive to solidification cracking when the silicon level falls between 0.5 and 2.0 wt %. A resulting Si—Al alloy with Si levels below 4.7 wt % limits the total amount of base metal dilution possible before reaching the crack sensitive range. This feature is especially important when TIG welding where dilution of the weld puddle by melted base metal is relatively high depending on the welding procedure. Alloys such as the 6xxx series that derive their mechanical properties though the precipitation of magnesium silicide during heat treatment are crack sensitive when welding chemistries fall in the range of 0.6 to 0.8 wt % Si and 0.5 to 1.0 wt % Mg in combination or in other words a total of about 2 wt % magnesium silicide. The 6xxx series alloys most susceptible to this are the alloys 6005 through and including 6061. This is the reason that the highest practical limit for Mg in an Al—Si filler metal alloy is 0.5 wt %. If 4043 filler alloy has obtained a minimum Mg level of 0.20 wt % through weld puddle dilution by melted 6xxx base metal, it will develop mechanical properties that are similar to those obtainable by post-weld heat treatment and aging of the 6xxx base metals to the -T6 temper. Compositions of X4043P shall have a Si content of 5.0 to 6.0 wt % and a Mg content of 0.31 to 0.50 wt %.

In certain embodiments, the composition has a specified Si range of 5.0 to 6.0 wt %. The typical target free silicon content for this embodiment is 5.2 wt %. This chemistry produces a liquid viscosity with an internal friction of 1.1 centipoises in the alloy when molten at 1292 degrees F. This is the fluidity that the industry had come to expect in ER4043 and what has been documented over the last half century of welding practice as performing satisfactorily. The Si range of 5.0 to 6.0 wt % is also advantageous in that it has a direct bearing on the electrical current required to melt the filler metal during welding. Changes here would necessitate the changing of the welding procedure specifications and the preprogrammed welding parameters in many welding machines used in manufacturing operations around the world.

Si content also affects thermal expansion of the alloy. A reduction of Si content will increase the coefficient of thermal expansion of the weld bead. For example, a 5.2 wt % Si content in the composition will yield a coefficient of thermal expansion of 0.94 with pure Al being 1.0. A 3.5 wt % Si content in the composition will yield a coefficient of thermal expansion of 0.97. Differences in thermal expansion between Al and known filler metal compositions cause increased distortion during welding and increase crack sensitivity as compared to the present compositions. Higher Si content reduces the solidification and solid state shrinkage rate. When compared to existing compositions, the higher Si content of the present compositions produces a higher volume fraction of eutectic phase which in turn reduces the shrinkage rate of the molten puddle. Therefore, the present compositions have crack sensitivity levels as good as or better than currently available alloys. Thus, the compositions can be used as a direct substitute for existing compositions, such as 4043, with no changes required in welding practices or procedures yet, it will provide the strength benefits greater than 4643, while 4643 has not been accepted as a direct substitute for 4043.

Due to the Mg content of the new compositions, they will not only be used as a direct substitute for 4043 but will provide the significant advantages of higher shear and tensile strengths in all types of welds. The instances of failing weld metal mechanical properties due to the lack of proper base metal dilution in the weld puddle will be eliminated. The Mg level may be controlled in this new alloy to remain below the crack sensitive level. The level is low enough to allow for some additional Mg obtained from dilution of the weld puddle by melted base metal when welding the 6xxx series alloys. Therefore, the new compositions have a maximum Mg content of 0.50 wt %. This level provides a safety factor for the possible additional Mg that might be alloyed into the weld puddle from dilution of melted base metal. When welding a lower strength 1xxx or 3xxx series alloy and some weld puddle dilution is inadvertently obtained, the inventor's alloy X4043P has a built in safety factor of 0.31 minimum Mg content which will keep Mg at acceptable levels and this is not found in either ER4043 or ER4643.

An aluminum alloy base metal obtains its strength either from work hardening, or from heat treatment, aging, and so forth, depending on the alloy. The welding process introduces a thermal cycle which creates an annealing effect compromising the strengthening mechanisms in the immediate regions next to the weld, known as the heat affect zone (HAZ). The HAZ is softened by the thermal cycle and loses its strength. The loss of strength in the HAZ is more pronounced in aluminum than in steel, and the HAZ can be weaker than the weld metal in a joint. This could be more pronounced when the weld is made stronger using the aluminum alloy welding wire described herein. This could adversely affect welds made using the aluminum alloy welding wire described herein in situations where the overall joint strength is dictated by the HAZ, as opposed to the weld itself. To overcome this potential problem, the weld size or cross-sectional area of the weld may be reduced while maintaining the same weld strength. The stronger weld enables the smaller weld size to achieve equivalent shear strength in the joint (e.g., a fillet joint). Smaller welds utilize less heat input to deposit the weld metal and, thus, provide less softening in a smaller HAZ, in addition to decreasing the potential welding production time. Another solution is to employ lower heat input welding processes to weld with the aluminum alloy welding wire described herein. One potential solution is to use a pulse welding process, an AC welding process, a controlled short circuit (CSC) process, a regulated metal deposition (RMD) process, an active wire process, a hot wire process, and cold metal transfer (CMT) process, each of which may use advanced waveforms and algorithms to reduce the amperage and/or voltage at specific times to reduce heat input and splatter. These welding processes can potentially make the same weld with less heat input than a conventional CV process.

The aluminum alloy welding wire described herein also increases the tolerance to weld discontinuities, such as porosity, which can weaken the overall joint strength. Aluminum joint design typically includes a safety margin to account for discontinuities in the manufacturing process, such as porosity. A stronger weld per unit cross-sectional area compensates for potential discontinuities inside the weld, for example, when surface oxide cleaning during production is not properly enforced.

Another benefit of lower heat input, either derived by controlling the welding process to form a smaller weld, or by using lower heat input welding processes, is reduced distortion in the weld assembly. Aluminum has approximately twice the thermal expansion coefficient of steel, and weld distortion is a more pronounced issue in welding aluminum than in welding steel. Using the lower heat input welding processes described above with the aluminum alloy welding wire described herein results in lower distortion propensity. Yet another benefit is faster weld cycle time when making a smaller weld.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of forming a weld joint, comprising:
   arc welding at least a portion of a work piece base metal with a filler metal to form the weld joint, wherein the filler metal is an Al—Si—Mg alloy consisting essentially of:
   5.0 to 6.0 wt % silicon;
   0.31 to 0.5 wt % magnesium; and
   the balance being aluminum and trace elements,
   wherein the trace elements consist of:
   a maximum allowable amount of iron of 0.8 wt %;
   a maximum allowable amount of copper of 0.3 wt %;

a maximum allowable amount of manganese of 0.05 wt %;

a maximum allowable amount of zinc of 0.2 wt %;

a maximum allowable amount of titanium of 0.2 wt %;

a maximum allowable amount of beryllium of 0.0003 wt %; and other trace elements are allowable in a maximum weight percent of 0.05% each, the other trace elements together being allowable in a maximum weight percent of 0.15% total.

2. The method of claim 1, wherein the weld joint comprises less than approximately 20% of the base metal.

3. The method of claim 1, comprising, after forming the weld joint, heating the filler metal of the weld joint to a temperature greater than room temperature for a period of time from 1 to 30 hours, wherein the filler metal of the weld joint has a transverse shear strength between approximately 25 KSI and approximately 35 KSI and a post-bonding tensile strength between approximately 35 KSI and approximately 50 KSI after heating.

4. The method of claim 3, wherein the weld joint has a transverse shear strength between approximately 28 KSI and approximately 33 KSI and a tensile strength between approximately 40 KSI and approximately 45 KSI after heating.

5. The method of claim 1, wherein the aluminum is present in a weight percent of between approximately 92.5% and approximately 95.0%.

6. The method of claim 1, wherein the Al—Si—Mg alloy consists essentially of:

5.0 to 6.0 wt % silicon;

0.3 to 0.5 wt % magnesium; and the balance being the aluminum and the trace elements.

7. The method of claim 1, wherein the process for forming the weld joint comprises a metal inert gas welding process.

8. The method of claim 1, wherein the process for forming the weld joint comprises a tungsten inert gas welding process.

9. The method of claim 1, wherein the process for forming the weld joint comprises a stick welding process.

10. The method of claim 1, wherein the process for forming the weld joint comprises a pulse welding process.

11. The method of claim 1, wherein the process for forming the weld joint comprises an alternating current welding process.

12. The method of claim 1, wherein the process for forming the weld joint comprises a controlled short circuit process.

13. The method of claim 1, wherein the process for forming the weld joint comprises a regulated metal deposition process.

14. The method of claim 1, wherein the process for forming the weld joint comprises an active wire process.

15. The method of claim 1, wherein the process for forming the weld joint comprises a hot wire process.

16. The method of claim 1, wherein the process for forming the weld joint comprises a cold metal transfer process.

17. The method of claim 1, comprising performing a plurality of successive passes in which the base metal or preceding passes of the filler metal are melted and additional filler metal is deposited.

18. The method of claim 17, wherein during at least one successive pass substantially all magnesium in the respective pass is provided by the filler metal.

19. The method of claim 1, wherein the weld joint has a tensile strength at least equal to the base metal.

20. The method of claim 1, wherein, of the trace elements of the Al—Si—Mg alloy, the maximum allowable amount of iron is 0.4 wt %, the maximum allowable amount of copper is 0.1 wt %, the maximum allowable amount of zinc is 0.1 wt %, and the maximum allowable amount of titanium is 0.15 wt %.

* * * * *